(12) United States Patent
Demant et al.

(10) Patent No.: US 8,510,373 B2
(45) Date of Patent: Aug. 13, 2013

(54) DATA SYNCHRONIZATION AND DISABLEMENT OF DEPENDENT DATA FIELDS

(75) Inventors: Hilmar Demant, Karlsdorf (DE); Sebastian Droll, Heidelberg (DE); Joachim Fitzer, Schriesheim (DE); Ioannis Grammatikakis, Maxdorf (DE); Jan Heiler, Walldorf (DE); Juergen Sattler, Wiesloch (DE); Frank Schertel, Mannheim (DE); Markus Viol, Walldorf (DE); Thorsten Weber, Mannheim (DE)

(73) Assignee: SAP AG, Walldorf (DE)

( * ) Notice: Subject to any disclaimer, the term of this patent is extended or adjusted under 35 U.S.C. 154(b) by 460 days.

(21) Appl. No.: 12/871,406

(22) Filed: Aug. 30, 2010

(65) Prior Publication Data

US 2012/0054263 A1 Mar. 1, 2012

(51) Int. Cl.
*G06F 15/16* (2006.01)

(52) U.S. Cl.
USPC .......................................................... 709/203

(58) Field of Classification Search
USPC .......................................................... 709/203
See application file for complete search history.

(56) References Cited

U.S. PATENT DOCUMENTS

| | | | | |
|---|---|---|---|---|
| 5,870,759 | A  * | 2/1999 | Bauer et al. | 1/1 |
| 6,674,450 | B1 * | 1/2004 | Toub et al. | 715/749 |
| 7,003,587 | B1 * | 2/2006 | Battat et al. | 709/227 |
| 2003/0046434 | A1 * | 3/2003 | Flanagin et al. | 709/248 |
| 2004/0153576 | A1 * | 8/2004 | Hansmann et al. | 709/248 |
| 2007/0276962 | A1 * | 11/2007 | La Pensee | 709/248 |
| 2008/0114720 | A1 * | 5/2008 | Smith et al. | 707/2 |
| 2008/0256177 | A1 * | 10/2008 | Boberg et al. | 709/203 |
| 2009/0216815 | A1 * | 8/2009 | Braginsky et al. | 707/203 |
| 2010/0262647 | A1 * | 10/2010 | Malek et al. | 709/203 |

* cited by examiner

*Primary Examiner* — Boris Gorney
(74) *Attorney, Agent, or Firm* — Brake Hughes Bellermann LLP (57) ABSTRACT

Methods for synchronizing data in client-server architectures are described. A client stores data in first and second fields. The value stored in the second field depends on the value stored in the first. When the client writes a new value to the first field, it disables writing to the second field. The client sends a refresh request and receives a refresh response from a server. The refresh request and response contain differences in data stored in the client and server fields. If the refresh response includes a new value for the second field, the client writes the value to the second field. A round trip pending flag associated with the first field is set. A data invalid flag associated with the second field is set. New data can be written to a third field when the value of the third field does not depend on the value of the first field.

14 Claims, 6 Drawing Sheets

DATA SYNCHRONIZATION AND DISABLEMENT OF DEPENDENT DATA FIELDS

TECHNICAL FIELD

This description relates to client/server based applications, and the synchronization of data between client and server based data objects.

BACKGROUND

Today, business is often conducted via portable and handheld computers. Devices such as smart phones, personal digital assistants, tablet based computers and netbooks, to name just a few, have a small physical footprint yet a rich graphical user interface. As such, they are well suited for data presentation and remote business use. While the computing power of such devices is considerable, it nonetheless pales in comparison to the computing power of a server or server farm. The same can be said of desktop and laptop computers. While such computers provide rich graphical user interfaces and posses considerable computing power in their own right, absolute computing power pales in comparison to the computing power of a server or server farm. As a result, many computationally intensive applications are most effectively run on servers or server farms. Still, it is often convenient to remotely access the data that is output by such computationally intensive applications on small footprint, hand-held devices or on simple desktop or laptop computers. For example, a salesperson can benefit from having instant access to all of the sales records of his or her customers, including detailed records of orders placed, shipments made, invoices sent, and payments received over a period of several years. Depending on the number and size of the customers, such records can be voluminous, and maintaining and analyzing them can be a computationally intensive task that is best left to an enterprise server or server farm. Nonetheless, the salesperson may benefit from having instant access to and the ability to mine the sales information to address issues that may arise during a sales call or while working on his or her desktop preparing to make a sales call. Moreover, the enterprise can benefit by allowing the salesperson to have write access to the sales records from any remote computer, thereby allowing the sales person to enter new or useful sales information such as the name and contact information of a customer's new purchasing agent.

Achieving both of these goals, i.e., running data intensive applications on server farms where they are most efficiently run while providing access to the output of these applications on remote devices like laptops, desktops or smart phones where they may most urgently be needed, can be accomplished using a client-server computing paradigm. In this paradigm, a client application running on a remote device can interface with and control a server application running on an enterprise server or server farm. The client based application can send commands and data to the server, while the server can execute the commands and return requested or updated data to the client. The information exchanged between the client and server systems in such a client-server computing architecture can often be interdependent. In interdependent systems, when information in a client object is changed, information in dependent objects cannot be safely changed until the change in the client object is registered with the server. Consequently, changes to the dependent client objects in the client user interface are prohibited. However, prohibiting changes to all of the objects in the client user interface reduces the utility and responsiveness of the interface. Thus, techniques for prohibiting changes in some client objects while allowing changes in other client objects architecture are provided.

SUMMARY

A computer implemented method for synchronizing data in a client-server architecture is disclosed.

In one general aspect, a client computer stores data in first and second data fields, and the data value stored in the second data field depends on the data value stored in the first data field. The client computer receives a first data value, writes the first data value to the first data field, and disables writing a new data value to the second data field. The client computer then sends a refresh request to a server computer that includes the first data value. The client computer receives a refresh response from the server computer before enabling writing a new data value to the second data field.

Implementations may include one or more of the following features. For example, the refresh request may include one or more data values. Each of the one or more data values in the refresh request is data that is stored in a respective data field in the client computer that differs in value from data that is stored in a corresponding data field in the server computer. The refresh response may include a second data value that is determined by the server computer and depends on the first data value. The client computer may write the second data value to the second data field. The refresh response may include one or more data values. Each of the one or more data values in the refresh response is data that is stored in a respective data field in the server computer that differs in value from data that is stored in a corresponding data field in the client computer. The client computer can set a round trip pending flag that is associated with the first data field after writing the first data value to the first data field. The client computer can set a data invalid flag that is associated with the second data field after writing the first data value to the first data field. The client computer can receive a third data value and write the third data value to a third data field when the data value stored in the third data field does not depend on the data value stored in the first data field.

In another general aspect, a client computer includes a data model having a first data field. The client computer receives a new data value and writes the new data value to the first data field. The client computer then determines any changes that need to be made to the data model as a result of writing the new data value to the first data field, and updates the data model to reflect the determined changes. The client computer then sends a refresh request to a server that includes at least the new data value. The client computer then receives a refresh response from the server, and updates the data model to reflect any changes that are needed based on the received refresh response.

Implementations may include one or more of the following features. For example, the client computer may update the data model by disabling writing a new data value to a second data field in the data model whose value depends on the value stored in the first data field until the client computer updates the data model to reflect any changes that are needed based on the refresh response received from the server.

DETAILED DESCRIPTION

Figure 1:
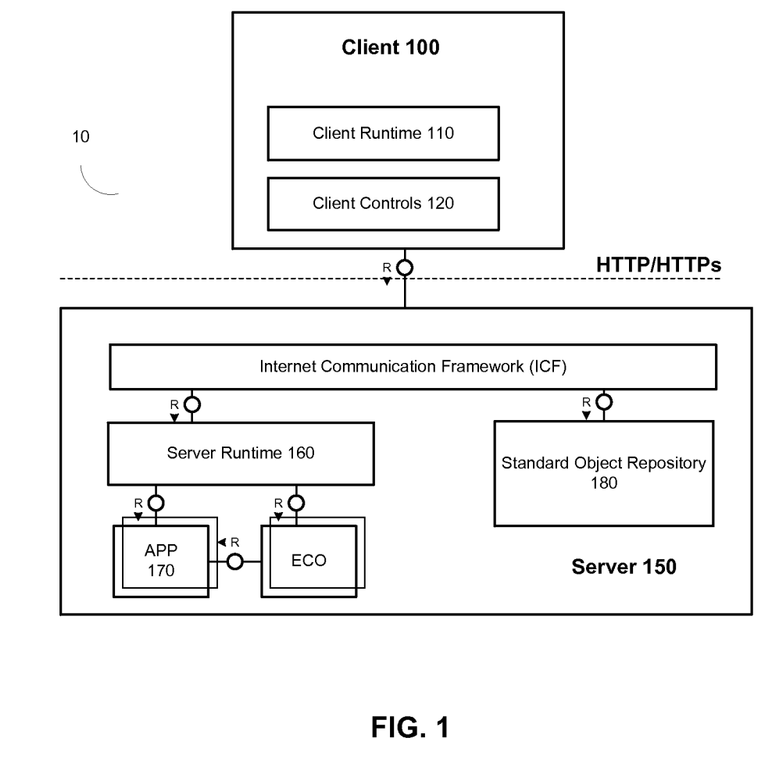
FIG. 1 is a block diagram of a system, including client and server computers, for executing an application using a client-server architecture.

FIG. 1 is a block diagram of a system 10 for executing an application using a client-server architecture. As shown in FIG. 1, system 10 includes a client computer 100 and a server computer 150. The client computer 100 runs a client runtime 110 that includes one or more controls 120. The server computer 150 runs a server runtime 160 and a backend application 170. The client runtime 110 generates and renders a graphical user interface (GUI) that allows a user of client computer 100 to graphically interact with and control the backend application 170 on server 150. The server runtime 160 communicates with both the client runtime 110 on client computer 100 and the backend application 170 on server 150. The server runtime 160 reads, writes, interprets, and translates data from backend application 170 into one or more declared UI component objects (see, FIG. 2) using a data model that is common to both the client runtime 110 and the server runtime 160. Preferably, the client runtime 110 is implemented as a browser plug-in, and executed as part of a browser running on client computer 100. Alternatively, a standalone client runtime (not shown) can be separately compiled, installed, and run independently of any browser running on client computer 100. Preferably, client runtime 110 and server runtime 160 communicate via hyper text transport protocol (HTTP), and exchange data using Java Script Object Notation (JSON). In other embodiments, client runtime 110 and server runtime 160 can communicate via secure HTTP (HTTP/s), and can exchange data using XML. Further details of client runtime 110 and server runtime 160 are provided below.

Figure 2:
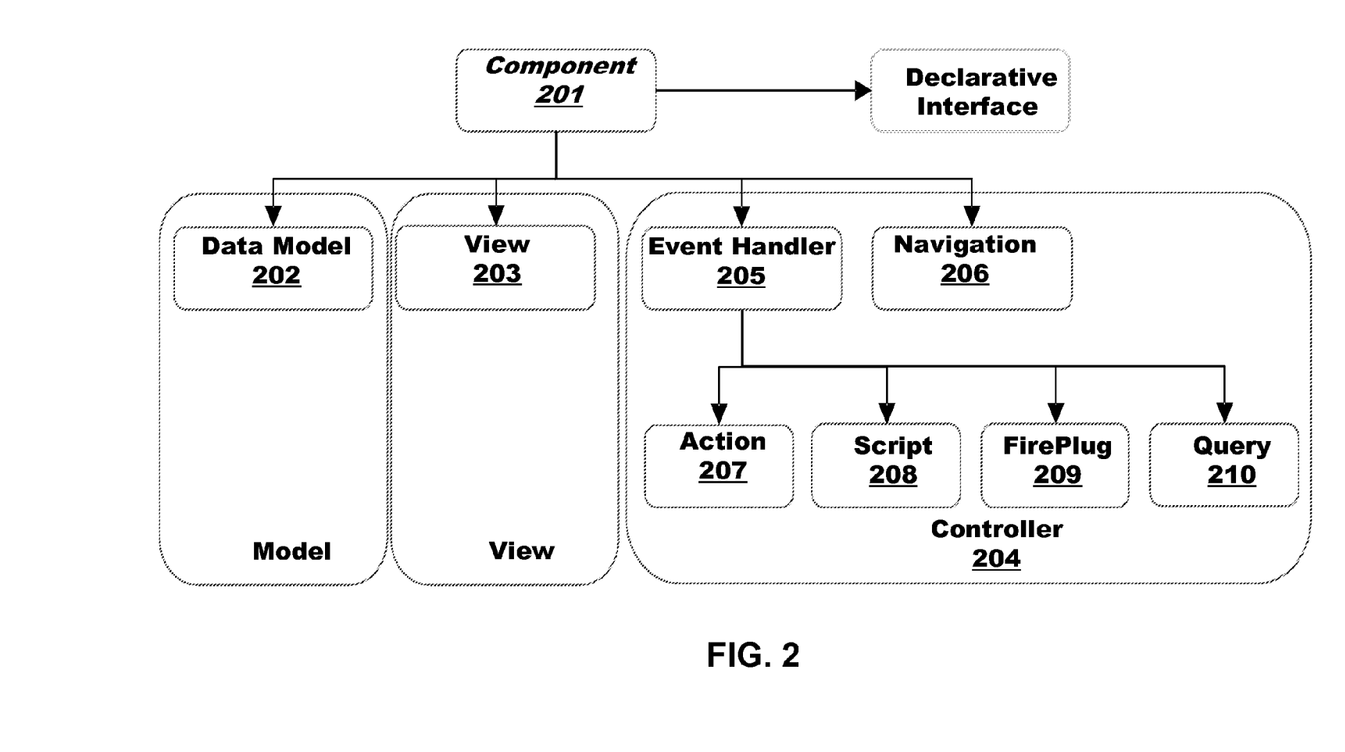
FIG. 2 is a schematic illustration of a declared UI component object.

FIG. 2 is a schematic illustration of a declared UI component object. UI component object 201 includes a data model 202, a view 203, and a controller 204. The data model 202 defines a universal data structure that is abstracted from the particular data and logic of the backend application 170. The view 203 describes the representation of the component object 201 and data from the data model 202 in a graphical user interface on the client computer 100. Through the UI component's view, event-handlers can be triggered when a user interacts with the component object. The controller 204 provides various means for handling and manipulating the data that is defined in the data model 202 of the component object 201. In particular, the controller 204 includes one or more event handlers 205 and one or more navigation paths 206. The event handlers 205 interpret events that occur within the client runtime 110 or server runtime 160, and bind data fields in the component object 201 to data sources (e.g., backend application 170) per the data model 202. The event handlers 205 can bind data fields to data sources through actions 207 (e.g., calling a function in application 170), scripts 208, or queries 210 (e.g., querying the data source).

Finally, the navigation paths 206 describe the mapping of operations and the flow of data between the component object 201 and other component objects in the client runtime 110, particularly when data in one component object depends on data in another component object. For example, if data in a component object (not shown) depends on data in component object 201, controller 204 can include a navigation path 206 that connects component objects 201. Controller 204 can use the navigation path 206 to notify component object when the data in component object 201 changes. Component object can be embedded in component object 201, or component object can be external to component object 201.

Each UI component object 201 is instantiated on both the client computer 100 and the server computer 150. Data in the client and server sides of the component object 201 are synchronized on an as needed basis. Thus, the client runtime 110 and server runtime 160 only exchange data that needs to be exchanged to maintain the current state of the UI and of the component objects 201 in both the client runtime 110 and the server runtime 160. Data fields in the client side of a component object 201 are bound to corresponding data fields on the server side of the component object, while data fields in the server side of the component object 201 are bound to data sources on the server 150 such as the backend application 170.

To improve system performance and preserve bandwidth on the communication channel between the client computer 100 and the server 150, only data that is currently needed or viewable is loaded from the backend application 170. For example, when data is retrieved from application 170 to populate a list object 201 on the client computer 100, the controller 204 for the list object 201 sends the current lead selection and other information from the current view 203 of the list object 201 to the server runtime 160. The server side list object 201 uses this information to query the application 170 for only those items in the list object 201 that are currently viewable in the view 203 of the client side list object 201. Similarly, if the client side list object 201 is a hierarchical list, the client list object 201 does not receive data needed to populate a child list object unless the child list object is the current lead selection of the client side list object 201. Thus, the child list object appears in a collapsed state when it is not the current lead selection in the client side list object 201, and appears in an expanded state when it is the current lead selection in the client side list object 201.

Changes made to data fields that are not in the current scope, focus, or lead selection of the user interface can nonetheless be made available to the client runtime 110 through a bound property framework. This framework allows the client runtime 110 to receive event notifications of changes that are made to out-of-scope or out-of-focus data fields by creating proxy objects having logical paths to the data fields. The client runtime 110 can be alerted to changes in the data fields monitored by the proxy objects regardless of whether the data fields are within the current focus, scope or lead selection of the client runtime 110. For example, a data model can consist of a sales order containing a list of items being sold, which list can contain one or more sub-lists containing details about each of the items on the sales list. If a user wanted to monitor for changes to the detailed sub-list (e.g., so the only items on the list are items that are made of stainless steel), the user could create a proxy object within the client runtime with a logical path such as "SalesOrder/Items/Details/Composition" that would alert the user to changes made to the composition of items on the list, regardless of whether the items were currently within the focus of the user interface.

Figure 3:
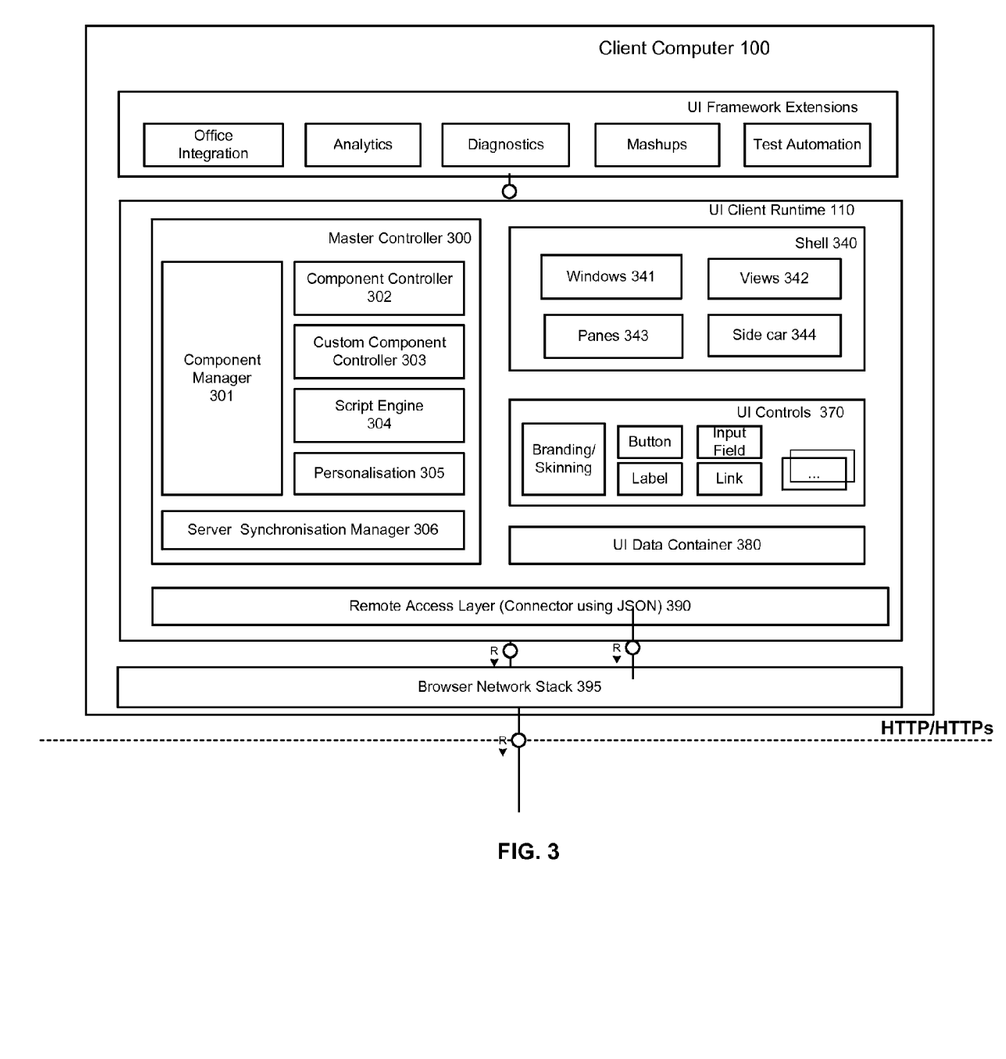
FIG. 3 is a block diagram of a client computer, including a client runtime that is capable of generating a UI for interacting with an application running on a server computer.

FIG. 3 is a block diagram of a client computer 100, including a client runtime 110 that is capable of generating a UI for executing an application 170 running on a server 150 in a client-server architecture. As shown in FIG. 3, the client runtime 110 includes a master controller 300, a shell 340, one or more UI controls 370, a UI data container 380, and a communications interface capable of establishing communication with a server runtime 160 on the server 150. In one implementation, the communications interface includes a JSON connector 390 and a browser stack 395. The master controller 300 includes a component manager 301, one or more component controllers 302 or custom component controllers 303, and a server synchronization manager 306. The master controller 300 may also include a scripting engine 304 and a personalization engine 305. The component manager 301 instantiates component objects 201 (see, FIG. 2) that make up the UI for the client runtime 110, and triggers the initialization of component objects 201 with data that is obtained from a data source such as backend application 170 running on server 150. The component objects 201 can be constructed from standardized UI controls 370, which can be obtained from a standard object repository 450 (see, FIG. 4) that is located on server 150. All component objects 201 in the client runtime 110 can be composed from the standard UI controls 370 or from other component objects 201. The top-level component object in the client runtime 110 can render a shell 340, which can consist of various windows 341, component object views 342 (i.e., views 203 of component objects 201), panes 343 and side cars 344 for personalization and help.

When the component manager 301 instantiates a component object, it also instantiates a controller 302 or 303 for the component object (i.e., a controller 204 for each component object 201 as shown in FIG. 2). The component manager 301 instantiates a standard component controller 302 for each UI control 370, and a custom component controller 303 for each composite component object (e.g., each component object that consists of two or more UI controls 370 or other UI component objects). As explained above in reference to FIG. 2, each component controller 302 or 303 binds the data fields of its component object to a data source (e.g., application 170) through an event handler 205 according to a data model 202. If data is bound to a component object 201 through a script, controllers 302 or 303 can trigger script engine 304 to execute that script. Each controller 302 or 303 can also trigger a refresh request and roundtrip data exchange with the server runtime 160 upon detecting a change to the data that is bound to its component object. These refresh requests and data exchanges are managed by a synchronization manager 306. The synchronization manager 306 identifies any data changes in a component object in the client runtime 110, and sends a refresh request to the server runtime 160 to reflect that data change in the corresponding server side component object.

Figure 4:
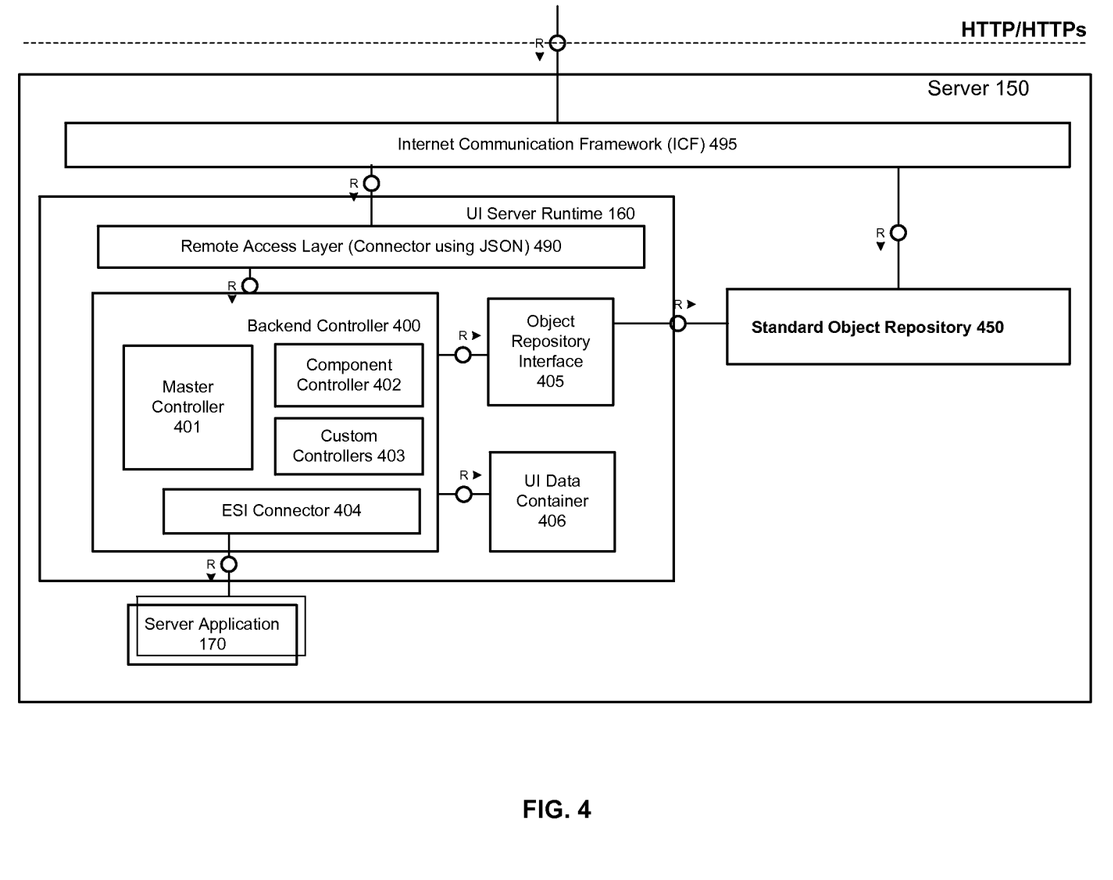
FIG. 4 is a block diagram of a server computer, including a server runtime that interfaces a client runtime running on a client computer with a data source running on the server.

FIG. 4 is a block diagram of a server 150, including a server runtime 160 that interfaces a client runtime 110 running on a client computer 100 with a data source such as an application 170 running on the server 150. The server runtime 160 includes a backend controller 400, an object repository interface 405, and a communications interface that is capable of connecting the server runtime 160 with a client runtime 110 on the computer 100. In one implementation, the communications interface includes an Internet Communications Framework 495 and a JSON connector 490. The backend controller 400 includes a master controller 401, one or more component controllers 402 or custom controllers 403, and a connector 404 to the application 170 running on the server 150. The object repository interface 405 connects the server runtime 160 with a standard object repository 450. The standard object repository 450 contains standardized UI component objects and controls, including standard data models that bind the data in the component objects and controls to a data source on server 150 such as application 170.

When a client runtime 110 is initialized on client computer 100, the client runtime 110 requests one or more UI component objects (which may be controls) from the server runtime 160, receives and instantiates the one or more UI component objects on the client computer 100, and requests initialization of the one or more component objects through the server runtime 160. When the server runtime 160 receives a request for a UI component object from the client runtime 110, it directs the request to the master controller 401. The master controller 401 retrieves the component object and its data model from the standard object repository 450, sends the component object and its data model to the client runtime 110. The master controller 401 also creates, within the service runtime 160, a component controller 402 or custom controller 403 and a data container 406 for the component object. The data container 406 stores data for the component object in a data structure defined by the component object's data model.

When the server runtime 160 receives the request to initialize the component object from the client runtime 110, it again directs the request to the master controller 401. The master controller 401 sends the request to the controller 402 or 403 of the component object. The controller 402 or 403 retrieves the initialization data from a data source on server 150 such as application 170, stores the data in the data container 406 for the component object, and sends the data to the synchronization manager 306 within the client runtime 110. The synchronization manager 306 in turn sends the data to the controller 302 or 303 of the client side component object, which writes the data to the client side data container 380 in the client runtime 110.

Subsequently, whenever the synchronization manager 306 on the client runtime 110 requests a refresh or roundtrip data exchange for a client side component object, the server side controller 402 or 403 for that component object receives and processes the request. For example, when data in a client side component object 201 is changed in the client runtime 110 (e.g., via user interaction), an event handler 205 in the controller 204 of the client side component object 201 sends the changed data to the synchronization manager 306 in the client runtime 110. The synchronization manager 306 asynchronously collects and sends the changed data to the master controller 401 in the service runtime 160. The master controller 401 sends the changed data to the controller 402 or 403 for the corresponding component object in the server runtime 160. The controller 402 or 403 receives the changed data, updates its data container 406, and performs any other actions indicated by the controller's event handler. Such actions may include sending the data to the application 170, calling a function in the application 170, or querying the application 170. In addition, controller 402 or 403 receives data from the application 170, updates the data container 406 for the component object, and sends the updated data to master controller 401 in the service runtime 160. Master controller 401 sends a message to the synchronization manager 306 in the client runtime 110 that includes the updated data. The synchronization manager 306 in turn sends the updated data to the controller 302 or 303 for the client side component object. The controller 302 or 304 then writes the updated data to the client side data container 380 for the component object to complete the roundtrip data exchange for the refresh request.

Figure 5:
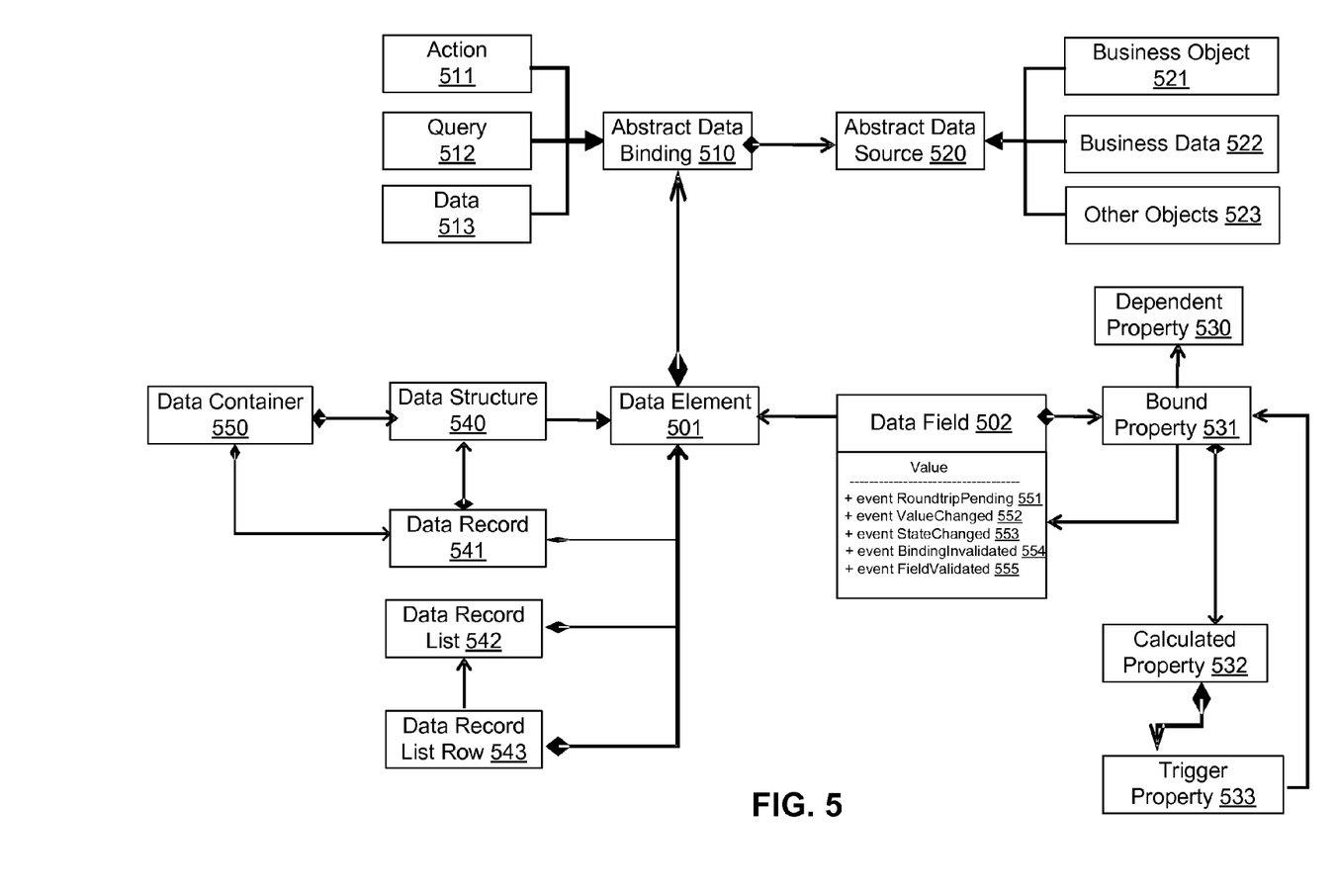
FIG. 5 is a schematic illustration of a class diagram showing the abstracted data model of a component object in the client runtime.

FIG. 5 is a schematic illustration of a class diagram showing the abstracted data model of a component object in the client runtime. The data model 202 defines the attributes for a data element 501 within a UI component object 201. For example, the data model 202 defines the binding 510 between the data element 501 and a data source 520. The data source 520 can be a backend application or business object 521 running on a remote server (e.g. application 170), an object or function within such an application 522, or another component object 523 in the client runtime 110. The binding 510 between the data element 501 and the data source 520 expresses a particular path to the data source 520. The path can be an action 511 such as a call to particular function within the data source 520, a query 512 of the data source 520, or a pointer to a particular data element or object 513 within the data source 520.

As further shown in FIG. 5, each data element 501 can be one part of a larger data structure 540 in the data model 202 of the component object 201. The client runtime 110 and server runtime 160 can access this data model 202 through a data container 550. For example, client runtime 110 can access the data model 202 of component object 201 through data container 380 shown in FIG. 3, while server runtime 160 can access the data model 202 through data container 406 shown in FIG. 4. The data structure 540 can organize the individual data elements 501 that make up component object 201 into data records 541 such as lists 542 or list rows 543.

As also shown in FIG. 5, each data element 501 includes a data field 502 that can hold the value of the data element. The value of the data field 502 can depend on or be bound to additional information or sources of data as indicated in a bound property field 531. For example, the value of the data field 502 can depend on the value of data in another data element as indicated in a dependent property field 530. In addition, the value of the data field 502 can depend on one or more calculations that are indicated in a calculated property field 532. The calculated property field 532 defines the calculations that are needed to compute the value of the data field 502 from the information available from the bound data source 520 and/or from any other data elements on which the value depends (e.g., as indicated in the dependent property field 530). When the value of the data field 502 is bound to other information such as a calculation 532 or data from another data element, one or more triggers 533 can be set to recalculate the value of data field 502 or invalidate data field 502 when a bound property 531 such as a calculated property 532 or a dependent property 530 changes. For example, if the value of the data field 502 is the sum of the values from two or more independent data fields, a trigger 533 can recalculate the sum and update the value of data field 502 when the value of at least one of the independent data fields changes.

The calculated property field 532 can be defined so that certain calculations can be performed on the client computer 100 rather than on the server computer 150 to preserve bandwidth between the client and server computers. For example, as discussed above, the value of 502 can be sum of two other data fields in two other client side component objects. When at least one of these data fields changes, the value of data field 502 can be immediately recalculated and updated on the client side without having to go through the server. This not only saves bandwidth between the client and server, but increases the efficiency and responsiveness of the client side user interface as the data is more readily updatable.

Finally, the data field 502 can also included a plurality of flags 551-555 containing metadata regarding the status of the data in data field 502. In particular, a round-trip pending flag 551 indicates when a change in the value of data field 502 has been propagated from the client runtime 110 to a corresponding component object 201 in the server runtime 160. A value change flag 552 indicates a change in the value stored in data field 502. This can occur, for example, as a result of a recalculation triggered by a propagated change in a dependent field. The synchronization manger 306 (FIG. 3) can poll or monitor the value change flag 552 of component objects in the client runtime 110 to identify those component objects that need to exchange data with their corresponding component objects in the server runtime 160. Similarly, the master controller 401 (FIG. 4) can poll or monitor the value change flag 552 of component objects in the server runtime 160 to identify those component objects that need to exchange data with their corresponding component objects in the client runtime 110. A state changed flag 553 indicates when the state of the data in data field 502 has changed (e.g., from valid to invalid). A binding invalidated flag 554 indicates whether the binding 510 of the data element 501 to the data source 520 is valid. The binding invalidated flag 554 can be set to invalid, for example, when the data source 520 (e.g., application 170) has crashed or is otherwise unavailable. This insures that only valid and up-to-date data is used and displayed in the client runtime 110. Finally, a field validated flag 555 indicates when the value in the data field 502 is valid.

As a user interacts with the graphical user interface in the client runtime 110, e.g., by selecting or editing a data field in a component object in the client runtime 110, the values that are stored in the data fields of component objects in the client runtime 110 can change either directly or indirectly. For example, the value of a data field 502 can change directly when the user enters data into the data field. By contrast, the value of a second data field can change indirectly when the change in the value of data field 502 triggers a recalculation of the value of the second data field. For example, the first data field can hold the price of an item in a foreign currency, and the second data field can hold the calculated price in U.S. dollars given a certain currency exchange rate.

When the value of a data field in a component object in the client runtime 110 changes, that change is either reported to or monitored by the synchronization manager 306 (FIG. 3). The synchronization manager 306 decides if and when an asynchronous refresh request is needed, and when needed, sends an asynchronous refresh request to the master controller 401 in the server runtime 160. The master controller 401 refreshes the state of the corresponding component object in the server runtime 160 to reflect the change in the value of the data field, and triggers the backend application 170 to refresh any other data fields that need to be refreshed in view of that change in value. Consequently, data values in other data fields in other component objects in the server runtime 160 may change, and the master controller 401 reports such changes back to the synchronization manager 306 in the client runtime 110. The synchronization manager 306, in turn, reports these changes to the appropriate component object controllers in the client runtime 110 so that the effected data fields can be refreshed and populated with the new data. For example, a user can select a country from a drop down list in the client runtime 110. This selection can be passed to the synchronization manager 306, and from there, to the master controller 401 in the server runtime 160. The master controller 401 can refresh a corresponding drop down list in the server runtime 160, and then trigger the backend application 170 to update any other data fields in the server runtime 160 that depend on the selected country. For example, a second drop down list can depend on the country selected from the first drop down list, and the backend application 170 can populate the second drop down list based on the country selected from the first drop down list. For example, the backend application 170 can populate the second drop down list in the server runtime 160 with the ten most popular tourist destinations in the selected country. This change to the second drop down list is then sent back through the master controller 401 to the synchronization manager 306 in the client runtime 110. The synchronization manager 306 in turn passes the changed data to the appropriate component object controllers in the client runtime 110 so that the corresponding second drop down list in the client runtime 110 is correctly populated.

It is worth noting that data can be lost in the data synchronization mechanism described thus far. For example, if the second drop down list in the client runtime 110 was expandable, and the user added data to the second drop down list after selecting a country from the first drop down list but before receiving the most popular tourist destinations for the selected country from the server runtime 160, the data the user added to the second drop down list in the client runtime 110 would be overwritten and lost. To prevent this, the second drop down list in the client runtime 110 is disabled whenever a round-trip request to refresh the contents of the first drop down list is pending between the client runtime 110 and the server runtime 160. Moreover, to maintain the responsiveness of the user interface, only those data elements in the client runtime 110 that depend on the data element being refreshed, and that can therefore be overwritten by the server runtime's response to the refresh request are disabled. This is achieved, for example, by declaring dependencies among data elements in the client runtime 110, and by flagging data elements in the client runtime 110 to indicate when their values have changed or when they are invalid due to a pending refresh request between the client and server runtimes. In this way, when a datafield is changed in the client runtime 110, one or more data fields that depend on the changed data field can be protected so that they are not overwritten or corrupted while a refresh request is pending between the client runtime 110 and the server runtime 160.

As explained above in reference to FIG. 5, a component object controller 204 can set an event value changed flag 552 to indicate when the value of a data element 501 has changed, and can set an event roundtrip pending flag 551 to indicate when a request to refresh that data element is pending between the client runtime 110 and server runtime 160. Moreover, a component object controller can be triggered to invalidate or disable a data field 502 by setting or clearing an event field validated bit 555 whenever a dependent property 530 on which the value of that data field 502 depends has changed. Thus, by setting and monitoring the metadata fields 551 through 555, and the bound and dependent property fields 530 through 533, the master controller 300 and component controllers 302 and 303 in the client runtime 110 can insure that whenever an asynchronous refresh request is pending between the client runtime 110 and the server runtime 160, only those data elements within the client runtime 110 that can be safely changed (i.e., that do not depend in any way on the data elements that are being refreshed) are enabled. By contrast, all data elements in the client runtime 110 that depend in any way on the value of the data elements that are in the process of being refreshed are disabled until the refresh request is sent to the master controller 400 in the server runtime 160, a reply is received from master controller 400, and any additional changes that are needed are applied to the dependent data elements in the client runtime 110. This mechanism thus prevents changes to dependent data fields in the client runtime 110 until the changes to their parent data fields are properly recorded in both the client runtime 110 and server runtime 160. The mechanism thus not only prevents data loss and potential data errors, but increases the responsiveness of the user interface since changes to data fields that are not dependent on altered or changed data fields can still be made in the user interface.

Figure 6:
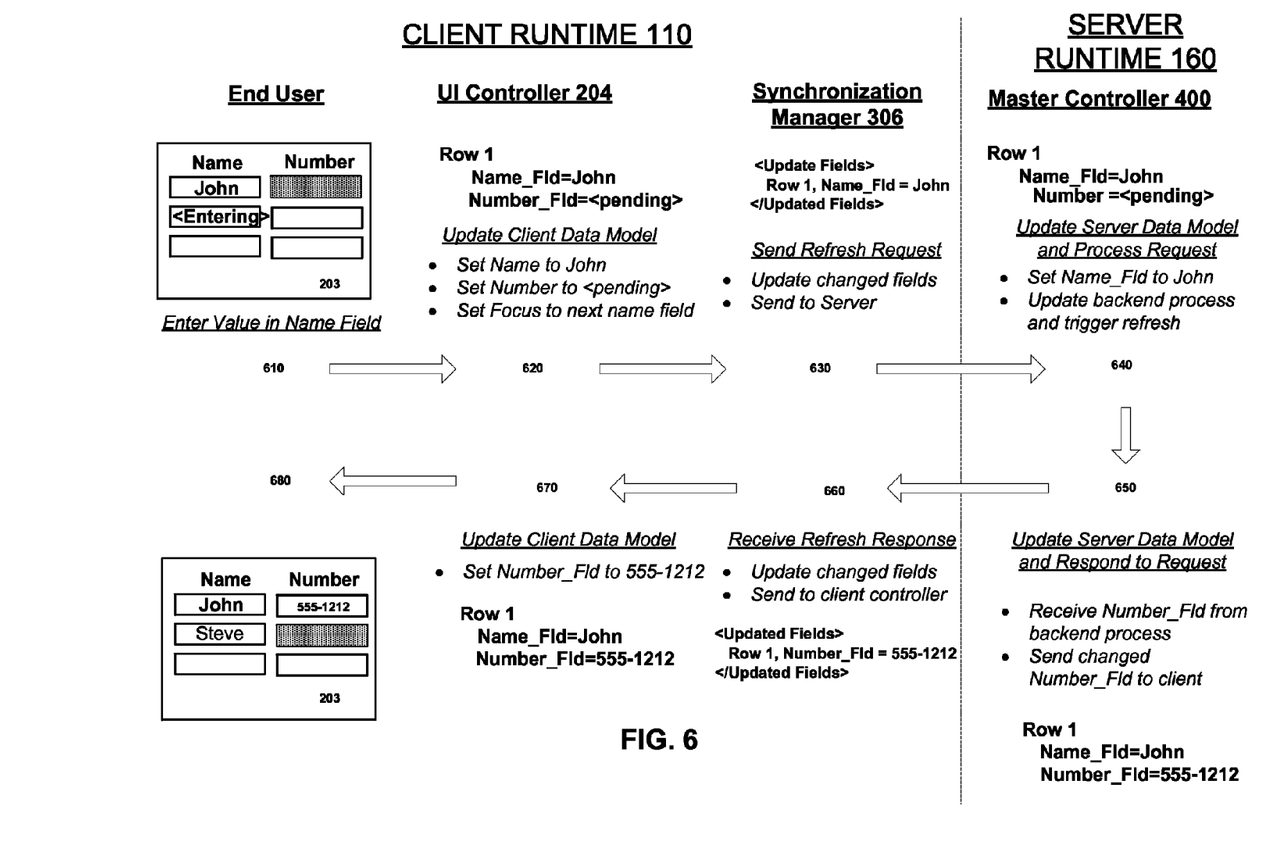
FIG. 6 is a schematic illustration of a method for refreshing a data field in a component object in a client-server environment.

FIG. 6 is a schematic illustration of a method for refreshing a data field in a component object in a client-server environment. As shown in the figure, an end user can interact with the view 203 of a component object 201 in a client runtime 110, for example, by entering the name John in a Name field (610). Event handlers in a controller 204 respond to this user input by updating the data model 202 of the component object (620). In particular, event handlers update the value of the Name field to "John," and set the event value changed flag 552 and the event round trip pending flag 551 (FIG. 5) that are associated with the Name field. Other event handlers respond to the change signaled by the event value change flag 552 for the Name field by setting (or clearing) an event field validated flag 555 (FIG. 5) for a Number field that depends on the changed Name field. This disables the Number field and prevents a user from inputting data into the field. Nonetheless, as shown in FIG. 6, the user is still able to enter data (e.g., additional names) in additional Name fields in the view 203 of the component object, thereby preventing loss of responsiveness of the user interface.

A synchronization manager 306 monitors and maintains information regarding all of the changes to the data fields in the client runtime 110 (e.g., as recorded in the event value changed flags 552), and determines when an asynchronous refresh request with the server runtime 160 is required. When a refresh request is required, the synchronization manager 306 sends the request to a master controller 401 running on the server runtime 160. The refresh requests contains only information about the data elements that have changed on the client runtime 110, such as the change to the Name field discussed above (630). This is done to preserve bandwidth on the communication channel between the client 100 and server 150.

Within the server runtime 160, the master controller 401 updates its data model 202 with the changes sent from the synchronization manager 306, and triggers execution of the backend application 170 in light of the changed data (640). The backend application 170 processes the changed data, for example, by calculating any additional changes that are needed to fields that depend on the changed data fields, and returns any such changes to the master controller 401. For example, upon receiving the value "John" in the Name field of a component object, the backend application 170 updates those data fields that depend on the entered name such as the telephone number or address associated with that name in a database, and sends those changes back to the master controller 401. The master controller 401 receives these additional changes and updates the component object in the server runtime 160. It then sends the changed data to the synchronization manager 306 in the client runtime 110 (650). As before, preferably only changed data are sent between the synchronization manager 306 and the master controller 401 to preserve bandwidth on the communications channel between the client 100 and server 150 computers.

When the synchronization manager 306 receives changes made by the backend application 170 to additional data fields (e.g., the Number field), it sends those changes to the appropriate component object controllers (660). Event handlers within the component object controllers, in turn, update the values of the changed data fields (670). In doing so, the event handlers also set flags to indicate that the data field values have changed and that the changes have been validated by the server 150. As a result of this overall refresh mechanism, correct and updated data values for dependent data fields (e.g., the correct phone number 555-1212 for John) are displayed in the view 203 of the component object in the client runtime (680). Moreover, as shown in FIG. 6, though the Number field for John was disabled in the client runtime 110 pending the refresh request with the server runtime 160, the end user was free to enter another name in another independent Name field of the component object.

While FIG. 6 illustrates invalidating a single dependent data field (i.e., Number) when changes are made to an independent data field (i.e., Name), in general more than one data fields can depend on a given independent data field. In such cases, when the independent data field is changed, event handlers for all of the dependent data fields can set (or clear) the event field validated flag 555 for the dependent data fields, thereby invalidating them. When the change to the independent data field is propagated to the server runtime 160, all of the dependent data fields will be updated in response to the changes made to the independent data field as described above, and the updated values for all of the dependent data fields will be propagated back to the client runtime 110, where they will be updated and validated as described above.

Moreover, while FIG. 6 illustrates the propagation of changes made to a single independent data field, in general more than one independent data field can be displayed in the user interface on the client runtime 110, and synchronization manager 306 can schedule a refresh request after changes are made to two or more of the independent data fields in the client runtime 110. In such cases, when changes are made to the two or more independent data fields, event handlers for all of the data fields that depend on the two or more changed independent data fields can set (or clear) the event field validated flag 555 for the dependent data fields, thereby invalidating them. When the changes made to the two or more independent data fields are propagated to the server runtime 160, all of the dependent data fields will be updated in response to the changes as described above, and the updated values for all of the dependent data fields will be propagated back to the client runtime 110, where they will be updated and validated as described above.

The methods and apparatus described herein may be implemented in digital electronic circuitry, or in computer hardware, firmware, software, or in combinations of them. They may be implemented as a computer program product, i.e., as a computer program tangibly embodied in a non-transitory machine-readable storage device for execution by, or to control the operation of, a processor, a computer, or multiple computers. Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). The method steps may be performed in the order shown or in alternative orders.

A computer program, such as the computer program(s) described above, can be written in any form of programming language, including compiled or interpreted languages, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network. Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both.

Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks. Machine readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the methods and apparatus may be implemented on a computer having a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The methods and apparatus described may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer implemented method for synchronizing data in a client-server architecture, comprising:
receiving a first data value on a client computer, wherein the client computer stores data in a first data field and a second data field and the data value stored in the second data field depends on the data value stored in the first data field;
writing the first data value to the first data field;
disabling writing a new data value to the second data field;
sending a refresh request to a server computer, wherein the refresh request includes one or more data values, and each of the one or more data values is stored in a respective data field in the client computer and differs in value from a corresponding data value that is stored in a corresponding data field in the server computer;

receiving a refresh response from the server computer; and enabling writing a new data value to the second data field.

2. The computer implemented method of claim 1, wherein the refresh response includes a second data value, further comprising writing the second data value to the second data field on the client computer.

3. The computer implemented method of claim 2, wherein the second data value is determined by the server computer and depends on the first data value.

4. The computer implemented method of claim 1, wherein the refresh response includes one or more data values, and each of the one or more data values is stored in a respective data field in the server computer and differs in value from a corresponding data value that is stored in a corresponding data field in the client computer.

5. The computer implemented method of claim 1, further comprising setting a round trip pending flag that is associated with the first data field after writing the first data value to the first data field.

6. The computer implemented method of claim 1, further comprising setting a data invalid flag that is associated with the second data field after writing the first data value to the first data field.

7. The computer implemented method of claim 1, further comprising receiving a third data value and writing the third data value to a third data field, wherein the data value stored in the third data field does not depend on the data value stored in the first data field.

8. A non-transitory computer-readable medium storing instructions operable to cause a programmable processor to:
receive a first data value on a client computer, wherein the client computer stores data in a first data field and a second data field and the data value stored in the second data field depends on the data value stored in the first data field;
write the first data value to the first data field;
disable writing a new data value to the second data field;
send a refresh request to a server computer, wherein the refresh request includes one or more data values, and each of the one or more data values is stored in a respective data field in the client computer and differs in value from a corresponding data value that is stored in a corresponding data field in the server computer;
receive a refresh response from the server computer; and
enable writing a new data value to the second data field.

9. The non-transitory computer-readable medium of claim 8, wherein the refresh response includes a second data value, further comprising instructions operable to cause the programmable processor to write the second data value to the second data field on the client computer.

10. The non-transitory computer-readable medium of claim 9, wherein the second data value is determined by the server computer and depends on the first data value.

11. The non-transitory computer-readable medium of claim 8, wherein the refresh response includes one or more data values, and each of the one or more data values is stored in a respective data field in the server computer and differs in value from a corresponding data value that is stored in a corresponding data field in the client computer.

12. The non-transitory computer-readable medium of claim 8, further comprising instructions operable to cause the programmable processor to set a round trip pending flag that is associated with the first data field after writing the first data value to the first data field.

13. The non-transitory computer-readable medium of claim 8, further comprising instructions operable to cause the programmable processor to set a data invalid flag that is associated with the second data field after writing the first data value to the first data field.

14. The non-transitory computer-readable medium of claim 8, further comprising instructions operable to cause the programmable processor to receive a third data value and write the third data value to a third data field, wherein the data value stored in the third data field does not depend on the data value stored in the first data field.

* * * * *